United States Patent [19]
Nanjo

[11] Patent Number: 4,537,476
[45] Date of Patent: Aug. 27, 1985

[54] RETRO-FOCUS TYPE WIDE ANGLE LENS

[75] Inventor: Yusuke Nanjo, Yokohama, Japan

[73] Assignee: Sony Corporation, Tokyo, Japan

[21] Appl. No.: 528,628

[22] Filed: Sep. 1, 1983

[30] Foreign Application Priority Data

Sep. 6, 1982 [JP] Japan .................. 57-154822

[51] Int. Cl.³ .................................. G02B 13/04
[52] U.S. Cl. ...................................... 350/461
[58] Field of Search ................ 350/461, 460, 459

[56] References Cited
U.S. PATENT DOCUMENTS 3,545,845 12/1970 Takahashi .................. 350/459

Primary Examiner—John K. Corbin
Assistant Examiner—P. M. Dzierzynski
Attorney, Agent, or Firm—Lewis H. Eslinger; Alvin Sinderbrand

[57] ABSTRACT

A retro-focus type wide angle lens has in succession from an object side a first negative meniscus lens having a convex surface facing the object side, a second positive lens, a third biconvex lens, a fourth negative doublet consisting of a biconvex lens and a biconcave lens, a fifth positive lens, and a sixth positive lens. Although this retro-focus type wide angle lens is formed of six lens groups and seven lens components, its field angle or angle of view is about 66°, its aperture ratio is 1:1.6, its total length is very short, the aperture of its first divergent lens group is very small and its various aberrations are satisfactorily compensated for.

1 Claim, 5 Drawing Figures

FIG. 1
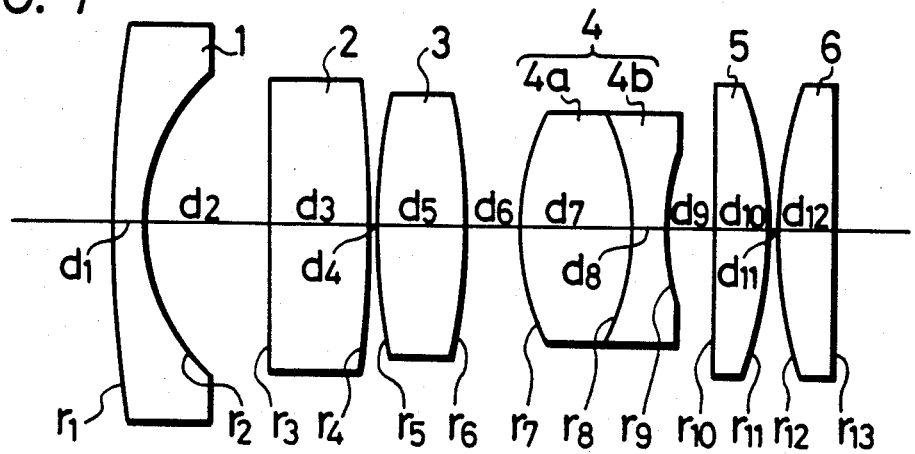
FIG. 2A  FIG. 2B  FIG. 2C  FIG. 2D
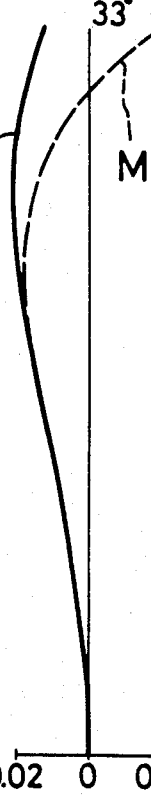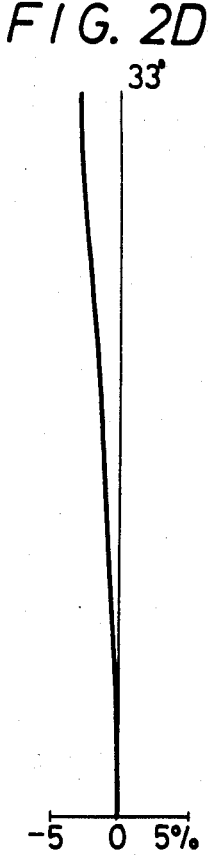
Chromatic Aberration
Spherical Aberration Sine Condition
Astigmatism
Distortion

RETRO-FOCUS TYPE WIDE ANGLE LENS

BACKGROUND OF THE INVENTION

1. Field of the Invention

The present invention relates generally to a wide angle lens and is directed more particularly to a so-called retro-focus type wide angle lens suitable for use with a television camera and having a field angle or angle of view of about 66°.

2. Description of the Prior Art

Prior art wide angle lenses of this kind with a long back focal length have the defect that the total length of the wide angle lens is long and the length of its first divergent lens group is also long. Further, the number of lens components forming the prior art wide angle lens is more than 8 and hence it is expensive.

Depending upon the structure of a television camera, it is possible that the back focal length required in the lens is made short and hence the restriction for the lens design is loosened. However, while the structure of the prior art retro-focus type wide angle lens is not changed, if the restriction for the back focal length is loosened to make it small in size, its Petzval sum is increased and the correction of the field curvature becomes inconvenient.

OBJECTS AND SUMMARY OF THE INVENTION

It is an object of the present invention to provide a wide angle lens in which the distortion is compensated despite its remarkably large field of view, while other aberrations are also well compensated.

A wide angle lens according to the present invention is a so-called retro-focus type wide angle lens comprising a first negative meniscus lens component having a convex surface facing the object side, a second positive lens component, a biconvex lens component, a fourth negative doublet component comprising a positive biconvex lens and a negative biconcave lens, a fifth positive lens component having a convex surface facing an image side, and a sixth positive lens component having its convex surface facing the object side.

The other objects, features and advantages of the present invention will become apparent from the following description taken in conjunction with the accompanying drawings in which the like references designate the same elements and parts.

BRIEF DESCRIPTION OF THE DRAWINGS

FIG. 1 is a schematic diagram showing an example of the wide angle lens according to the present invention; and FIGS. 2A to 2D are respectively graphs showing various aberrations.

DESCRIPTION OF THE PREFERRED EMBODIMENT

FIG. 1 shows the whole of an example of the wide angle lens according to the present invention. In the example of FIG. 1, in succession from an object side (in the figure, the left side) there are located a first lens component 1, a second lens component 2, a third lens component 3, a fourth lens component 4, a fifth lens component 5 and a sixth lens component 6. The first lens component 1 is a negative meniscus lens having its convex surface facing the object side. The second, third, fifth and fixth lens components 2, 3, 5 and 6 are respectively positive or convex lenses. The fourth lens 4 is a negative doublet formed of a positive or biconvex lens component 4a and a negative or biconcave lens component 4b.

The wide angle lens of the invention shown in FIG. 1 satisfies the following conditions (A) to (D):

(A) $1.3f < |f_1| < 2f$
(B) $d_2 + d_3 + d_4 < 2f$
(C) $\nu_2 < 40$
(D) $1.2 < r_7/r_9 < 2$ where f is the total focal length of the whole lens system;
$f_1$ is the focal length of the first lens 1;
$d_i$ is the i'th thickness or space as measured along the optical axis (refer to FIG. 1);
$\nu_2$ is the Abbe number of the second lens 2; and
$r_i$ is the curvature radius of the i'th curvature surface.

The conditions (A) and (B) relate to the compensation of the spherical aberration and the Petzval sum and to making the lens system small in size. When the absolute value $|f_1|$ exceeds the upper limit 2f, the compensation of the sherical aberration becomes insufficient, the Petzval sum is increased and it becomes difficult to compensate for the field curvature. On the contrary, when the absolute value $|f_1|$ is decreased beyond the lower limit 1.3f, the compensation of the Petzval sum becomes advantageous but the spherical aberration is over-compensated, which is improper. For the compensation of the spherical aberration, it is effective to increase the value $(d_2+d_3+d_4)$. However, if this value exceeds 2f, the total length of the wide angle lens proper and the back focal length thereof both become long, which is opposite the propose of the present invention to make the lens system small in size.

The condition (C) relates to the compensation for the lateral chromatic aberration. It is effective that the lateral chromatic aberration caused by the first lens 1 is compensated for by the second lens 2. It is difficult for the chromatic aberration on the optical axis and the lateral chromatic aberration to be compensated for with good balance by the lens components following the second lens component 2. Even though the first lens component 1 is made of low dispersion glass, if the second lens component 2 is not made to satisfy the condition $\nu_2 < 40$, it is difficult to compensate for the lateral chromatic aberration.

The condition (D) relates to the compensation of the Petzval sum. In the example of the invention shown in FIG. 1, the first lens 1 is formed of the negative or concave lens so as to easily compensate for the aberration of a wide field angle and further, the total length and the back focal length thereof are made short to minimize the size of the lens system. Such construction is close to the retro-focus type lens in which the refracting force of the forward negative lens components is made feeble and, if this construction is unchanged, it causes the Petzval sum to be increased. According to the present invention, the ratio between the curvature radii $r_7$ and $r_9$ of the front and rear curvature surfaces of the fourth lens component 4 is made larger than its lower limit value in order to ensure good compensation. If, however, the above ratio exceeds its upper limit value, the coma aberration originating at the ninth curvature surface $r_9$ is increased moreover, the field curvature is increased so that the compensation therefor becomes difficult. Now, an Embodiment of the present invention will be exemplified.

Embodiment

Focal length f=1, Aperture ratio=1:1.6 and Angle of view=66°

| $r_i$: Radius of Curvature | $d_i$: Thickness, Distance | $n_i$: Refractive Index | $\nu_i$: Abbe number |
|---|---|---|---|
| $r_1 = 4.6308$ | | | |
| | $d_1 = 0.1146$ | $n_1 = 1.60311$ | $\nu_1 = 60.7$ |
| $r_2 = 0.8104$ | | | |
| | $d_2 = 0.5078$ | | |
| $r_3 = \infty$ | | | |
| | $d_3 = 0.4012$ | $n_2 = 1.7077$ | $\nu_2 = 27.8$ |
| $r_4 = -8.1556$ | | | |
| | $d_4 = 0.0229$ | | |
| $r_5 = 2.2008$ | | | |
| | $d_5 = 0.3508$ | $n_3 = 1.67790$ | $\nu_3 = 55.3$ |
| $r_6 = -2.2008$ | | | |
| | $d_6 = 0.2292$ | | |
| $r_7 = 1.0374$ | | | |
| | $d_7 = 0.4470$ | $n_4 = 1.72000$ | $\nu_4 = 43.7$ |
| $r_8 = -1.0374$ | | | |
| | $d_8 = 0.1146$ | $n_5 = 1.76182$ | $\nu_5 = 26.6$ |
| $r_9 = 0.6774$ | | | |
| | $d_9 = 0.1949$ | | |
| $r_{10} = \infty$ | | | |
| | $d_{10} = 0.2292$ | $n_6 = 1.77250$ | $\nu_6 = 49.6$ |
| $r_{11} = -1.7767$ | | | |
| | $d_{11} = 0.0229$ | | |
| $r_{12} = 1.7767$ | | | |
| | $d_{12} = 0.2292$ | $n_7 = 1.77250$ | $\nu_7 = 49.6$ |
| $r_{13} = \infty$ | | | |

Focal length $f_1$ of the first lens component $1 = -1.6473$ and Back focal length=0.6824.

FIGS. 2A to 2D respectively show the aberrations. From the figures, it is understood that the respective aberrations are compensated for satisfactorily.

The above description is given on a single preferred embodiment of the invention, but it will be apparent that many modifications and variations could be effected by one skilled in the art without departing from the spirit or scope of the novel concepts of the invention, so that the scope of the invention should be determined by the appended claims only.

I claim as my invention:

1. A retro-focus type wide angle lens system having an optical axis, an object side and an image side and an angle of view within the range of 60° to 70°; comprising:
    in succession from the object side, a first negative meniscus lens component having a convex surface facing the object side;
    a second positive lens component;
    a third biconvex lens component;
    a fourth negative doublet component formed of a positive biconvex lens and a negative biconcave lens and having an object-side lens surface and an image-side lens surface;
    a fifth positive lens component having a convex surface facing the image side; and
    a sixth positive lens component having a convex surface facing the object side,
    the lens system satisfying the conditions:

$1.3f < |f_1| < 2f$ $d_2 + d_3 + d_4 < 2f$ $\nu_2 < 40$ $1.2 < r_7/r_9 < 2$ where $f_1$ is the focal length of said first lens component, $d_2$ is the distance along the optical axis between said first and second lens components, $d_3$ is the thickness along the optical axis of said second lens component, and $d_4$ is the distance along the optical axis between said second and third lens components, $\nu_2$ is an Abbe number of said second lens component, and $r_7$ and $r_9$ are curvature radii of said object-side and image-side lens surfaces, respectively, of said fourth lens component.

* * * * *